US010600004B1

(12) United States Patent
Misko et al.

(10) Patent No.: US 10,600,004 B1
(45) Date of Patent: Mar. 24, 2020

(54) MACHINE-LEARNING BASED OUTCOME OPTIMIZATION

(71) Applicant: AM MobileApps, LLC, Seattle, WA (US)

(72) Inventors: John Robert Hudson Misko, Seattle, WA (US); Alexander Francis Woodhouse, Seattle, WA (US); Frederick Stephenson Ackroyd, San Francisco, CA (US)

(73) Assignee: AM MOBILEAPPS, LLC, Seattle, WA (US)

(*) Notice: Subject to any disclaimer, the term of this patent is extended or adjusted under 35 U.S.C. 154(b) by 0 days.

(21) Appl. No.: 16/178,449

(22) Filed: Nov. 1, 2018

Related U.S. Application Data

(63) Continuation of application No. 15/803,676, filed on Nov. 3, 2017.

(51) Int. Cl.
*G06N 20/00* (2019.01)
*G06N 3/04* (2006.01)
*G06N 7/00* (2006.01)
*G06Q 30/02* (2012.01)

(52) U.S. Cl.
CPC ............... *G06N 20/00* (2019.01); *G06N 3/04* (2013.01); *G06N 7/005* (2013.01); *G06Q 30/0202* (2013.01)

(58) Field of Classification Search
CPC .......... G06N 20/00; G06N 3/04; G06N 7/005; G06Q 30/0202
See application file for complete search history.

(56) References Cited

U.S. PATENT DOCUMENTS

| | | | | |
|---|---|---|---|---|
| 9,092,802 | B1* | 7/2015 | Akella | G06Q 30/0256 |
| 10,402,723 | B1* | 9/2019 | Silberman | G06N 20/20 |
| 2010/0169328 | A1* | 7/2010 | Hangartner | G06F 16/337 |
| | | | | 707/751 |
| 2012/0246684 | A1* | 9/2012 | Yarvis | G06Q 30/02 |
| | | | | 725/60 |
| 2014/0156566 | A1* | 6/2014 | Kabiljo | G06Q 30/02 |
| | | | | 706/12 |
| 2017/0098197 | A1* | 4/2017 | Yu | G06Q 10/1095 |
| 2018/0013844 | A1* | 1/2018 | Foged | H04L 51/32 |

OTHER PUBLICATIONS

Covington, Paul, Jay Adams, and Emre Sargin. "Deep neural networks for youtube recommendations." Proceedings of the 10th ACM conference on recommender systems. ACM, 2016. (Year: 2016).*

\* cited by examiner

*Primary Examiner* — Eric Nilsson
(74) *Attorney, Agent, or Firm* — Alleman Hall Creasman & Tuttle LLP

(57) ABSTRACT

One example provides a recommendation system configured to receive, from a plurality of remote devices, user data corresponding to a plurality of users. The recommendation system is further configured to, for a user of interest, determine, using an optimizer comprising a machine learning model, a default likelihood of an outcome of interest being achieved based at least on a set of user actions of the user of interest that have occurred after a start point and to determine, using the optimizer, a first hypothetical likelihood of the outcome of interest being achieved based at least on the set of user actions and on a first possible user action being a next user action hypothetically performed. The recommendation system is further configured to, determine a next action to recommend to the user of interest, and output the next action to recommend.

20 Claims, 10 Drawing Sheets

MACHINE-LEARNING BASED OUTCOME OPTIMIZATION

CROSS REFERENCE TO RELATED APPLICATION

This application is a continuation of U.S. patent application Ser. No. 15/803,676 filed on Nov. 3, 2017 and entitled "MACHINE-LEARNING BASED OUTCOME OPTIMIZATION," the entire contents of which is incorporated herein by reference for all purposes.

BACKGROUND

In many different contexts, the success of one person may rely on actions of another. However, it may be difficult for a person trying to reach a goal to effectively influence another person upon whom the goal is dependent. For example, in some organizations, there may be a relatively long lead time associated with acquiring a new end customer or distributor, during which time there may be limited opportunities for personal interactions. As such, it may be difficult for the person trying to acquire the new customer or distributor to determine what actions to take, if any, to improve the likelihood of meeting the goal.

SUMMARY

Examples are disclosed that relate to using machine learning approaches to optimize a likelihood of an outcome of interest being achieved. One example provides a recommendation system comprising a logic device, and a storage device holding instructions executable by the logic device to receive, from a plurality of remote devices, user data corresponding to a plurality of users, where the user data for each user comprises a set of user actions that have been performed by the user, and for each user action, a point in time at which the user action was performed. The recommendation system is further configured to, for a user of interest, determine, using an optimizer comprising a machine learning model, a default likelihood of an outcome of interest being achieved based at least on a set of user actions of the user of interest that have occurred after a start point and before an endpoint, the start point and the endpoint set by an instantiating function, and to determine, using the optimizer, a first hypothetical likelihood of the outcome of interest being achieved based at least on the set of user actions and on a first possible user action being a next user action hypothetically performed. The recommendation system is further configured to, based at least on comparing the first hypothetical likelihood and the default likelihood, determine a next action to recommend to the user of interest, and output the next action to recommend.

Another example provides an alert system comprising a logic device and a storage device holding instructions executable by the logic device to receive, from a plurality of remote devices, user data corresponding to a plurality of users, where the user data for each user comprises a set of user actions that have been performed by the user, and for each user action, a point in time at which the user action was performed. The alert system is further configured to, for a user of interest, input the user data into a detector comprising a machine learning model, receive from the detector a likelihood of an occurrence of an event regarding the user of interest, and when the likelihood exceeds a threshold likelihood, then output an alert regarding a likelihood of the event occurring.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1C:
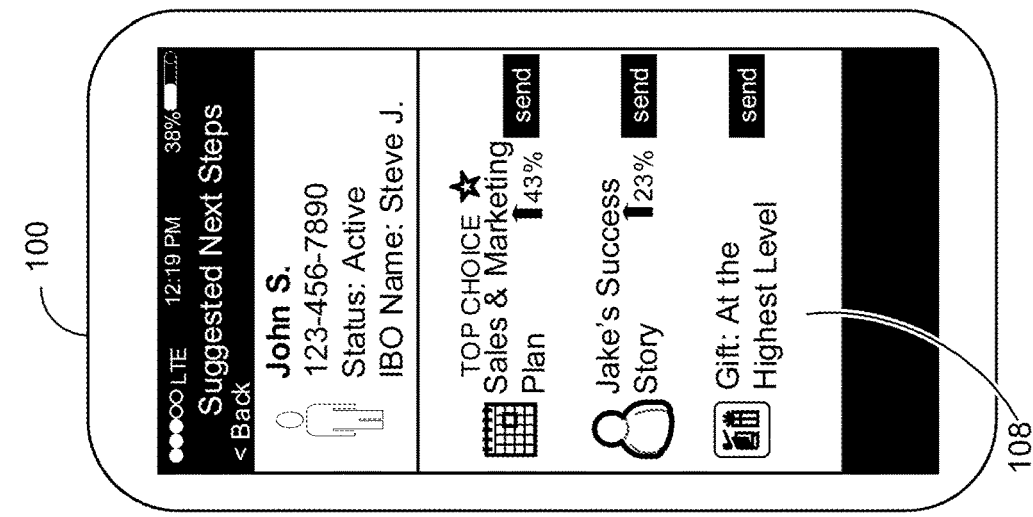
FIGS. 1A-1C show an example prospect user interface for a relationship management application, and show an output of a recommendations system illustrating examples of recommended next actions to take.

As mentioned above, it may be difficult for a person trying to reach a goal to effectively influence another person upon whom the goal is dependent. Such problems may be due at least in part due to limited opportunities for personal interactions with that person. As an example, in many organizations, gaining new relationships (e.g. members, customers, distributors, etc.) may involve some lead time during which the person seeking to establish the relationship has limited interactions with the prospect. Thus, the person trying to achieve the goal often relies on factors such as personal experience and word of mouth from others to determine what actions to take that may help influence the person upon whom the goal is dependent. Long-term retention poses similar issues, where meeting a long-term goal may depend upon retaining others in an organization.

Accordingly, examples are disclosed herein that relate to machine learning-based approaches for determining actions that one or more persons may take with regard to a person of interest, to help optimize the likelihood that an outcome of interest will be reached for the person of interest (e.g., that the person of interest will later act in a way that helps the taker of the action meet a goal). As described in more detail below, the disclosed examples may be implemented in a computer network environment, using server-client and/or peer-to-peer relationships. As a plurality of users take actions with regard to one another over the computer network, a cloud-based computing system may receive, via instructions executed on the computing system, user data from computing devices of the plurality of users, wherein the user data for each user comprises a set of user actions that have been performed by the user, and a point in time (e.g. an actual time, an approximate time, a date, or other suitable representation of time) at which each user action was performed. Example actions include, but are not limited to, sharing media content, sending a gift or financial incentive, sending a predefined message, sending a personalized message, sending an invitation to chat, sending an invitation to join an organization, sending an invitation to attend an event, and sending an invitation to purchase a product or service.

Over time, a large amount of user data may be accumulated and used to train machine learning models to help predict the likelihood of outcomes based upon user actions taken. One context in which such actions may be used to predict outcomes is in the context of recruiting new customers or distributors. For example, a current member of a sales organization may invite possible new customers or distributors ("prospects") to interact with the current member via a communications application used by the organization, e.g. via an app installed on devices of the prospects, via a web-based client executable in a web browser program, and/or in any other suitable computer network-based manner. Then, actions taken by a current member of the sales organization with regard to a prospective distributor or customer who opens an account on the application may be received and stored. Such data accumulated over time may be used to train a machine learning model to predict a likelihood that the person will become a new customer or distributor (as an example of an outcome of interest) based upon interactions that occur on the application between the current member and the prospect. In some examples, interactions that occur within a defined time period, such as between first opening an account on the application (or other suitable start point) and an endpoint set based upon a fixed time interval after the start point, may be analyzed based on a likelihood of achieving the outcome of interest being at a maximum sometime during that fixed time interval. Such a function may be referred to herein as an optimizer, in that the function is configured to optimize the likelihood of the occurrence of the outcome of interest.

Once the optimizer is trained, the optimizer not only may be used to determine the likelihood of an outcome of interest being met based upon past user data (referred to herein as a "default likelihood"), but also may be used to predict a likelihood of the outcome of interest being reached based upon a hypothetical next action taken by the user seeking to influence the prospect. Such a hypothetical likelihood may be determined by using, for the optimizer, an input vector comprising the set of user actions that have occurred during the defined time period and also a possible user action that is hypothetically performed next. Performing this computation for each possible next user action yields a set of likelihood data regarding how likely the outcome of interest is to be reached based on each possible next user action being performed as a hypothetical next user action. This set of likelihood data then may be used to select one or more recommendations to output, for example, based on a likelihood ranking (e.g. highest likelihood or probabilities) and/or on any other suitable factors. In some examples, the one or more recommendations may be output to the user, and may recommend actions to take with regard to the prospect. In other examples, any other suitable output may be provided, including outputs that indicate an optimal next action is not to take any immediate action with regard to the prospect.

Figure 1B:
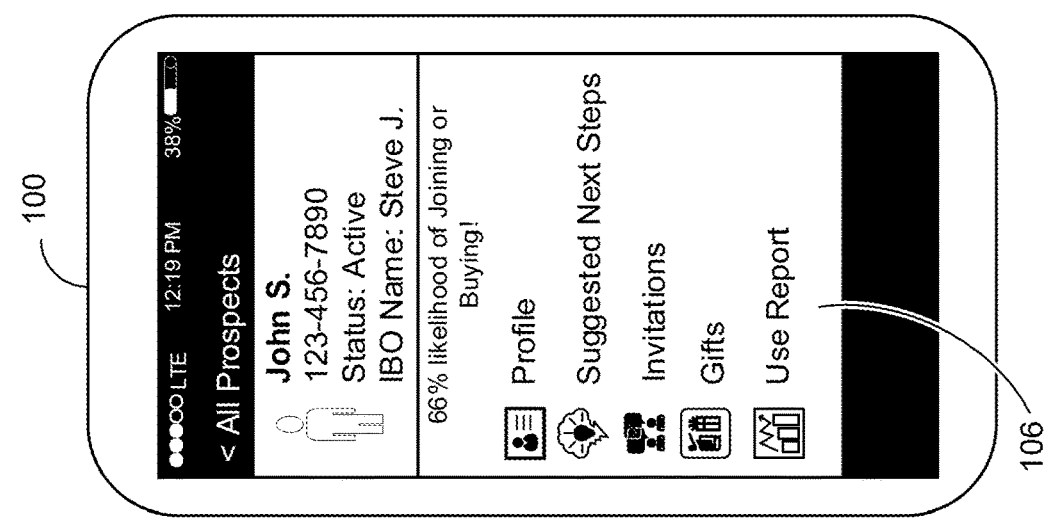
Figure 1A:
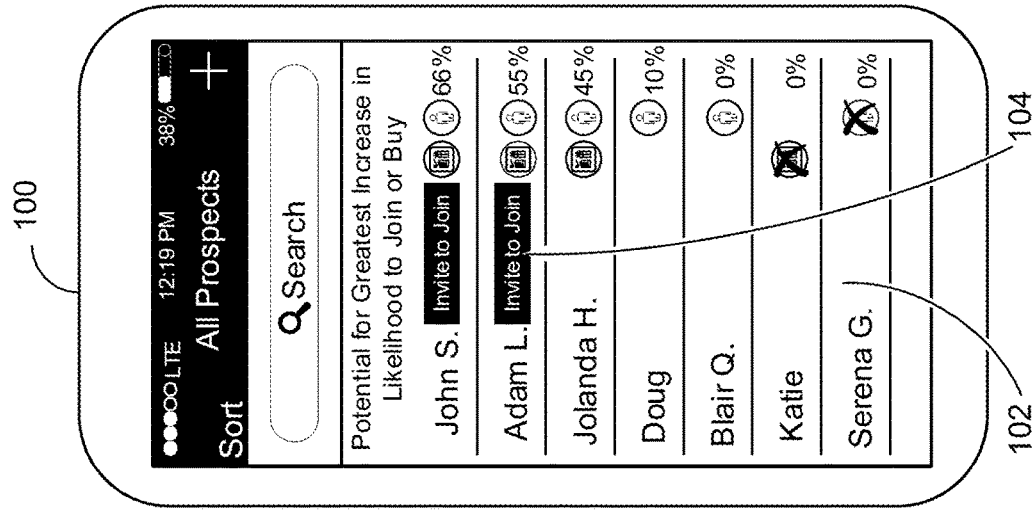

FIGS. 1A-1C show an example mobile device 100, and illustrate various aspects of an example prospect user interface for a relationship management application. First, interface 102 of FIG. 1A shows a displayed list of prospects, wherein the list comprises, for each prospect, a value representing a likelihood that the prospect may join the relevant organization as a distributor or buy as a customer. Further, interface 102 also comprises a selectable element 104 to allow the user of mobile device 100 to easily send an invitation to join the organization to prospects that meet a threshold likelihood (in this example, around 50% or greater). As described below, the displayed probabilities may correspond to a default likelihood determined using a trained machine learning model, based upon past activity of the prospects in the relationship management application environment.

A user of mobile device 100 may select any name in the list of prospects in interface 102 to transition to interface 106 of FIG. 1B for the selected prospect. Included in this interface is a "suggested next steps" control that is selectable to recommend next actions to take with regard to that prospect to optimize a likelihood of the prospect becoming a customer or distributor. Interface 108 may be displayed after a user selects the "suggested next steps." Interface 108 of FIG. 1C shows three suggested actions that a user of the mobile device 100 may take regarding the selected prospect, and also illustrates how much more likely it is for the prospect to become a customer or distributor if each action is taken as a next action by the user of the mobile device 100. For example, interacting with the "Sales & Marketing Plan" is predicted to increase the likelihood for the prospect to become a customer or distributor by 43%. In this example, the suggested actions also show personalized content created by another user of the relationship management app, namely, "Jake's Success Story," which includes a personalized video containing advice and stories from Jake's experience with the relevant organization. In this example, "Jake's Success Story" is predicted to increase the likelihood by a lesser amount than the "Sales & Marketing Plan," but in other examples may have a highest likelihood. As described below, the displayed increased probabilities may correspond to hypothetical likelihoods determined by the machine learning model using the data for generating the default likelihood augmented with the illustrated action as a hypothetical next action.

Further, interface 106 also includes "send" controls that allow the user of the mobile device 100 to easily take any of the recommended next actions by sending the corresponding material (or a link to the material) to the prospect. In some cases, it may not be appropriate to recommend any specific action, as the machine learning function may predict that each possible action results in a lower likelihood of becoming a customer or distributor than if no action were taken. In such cases, the "suggested next steps" button may be disabled. Alternately, the "suggested next steps" button may be enabled, but the user interface may indicate that the user should wait before providing a recommendation to the prospect, or provide any other suitable indication that there is no appropriate recommendation available.

Further, as mentioned above, long-term retention of persons of interest can pose challenges. As such, the user data described above also may be used to train a machine learning model to detect the possibility of an event (such as attrition) occurring with regard to an established relationship. Such a machine learning model may analyze a time-limited data set, or all user data for a user. Further, different detectors may be trained with each type of data and both used to detect the possibility of the event occurring. A program that comprises such a machine learning model and/or utilizes the output of such a machine learning model may be referred to herein as a detector. Upon detecting a likelihood that indicates the event has a threshold likelihood of occurring, the detector may output an alert regarding the likelihood of the event occurring. Further, in some examples, an optimizer function then may be utilized to provide a recommendation of one or more possible next actions to take to increase or decrease the likelihood of the event occurring, depending upon a nature of the event and a desired outcome of interest.

Figure 2C:
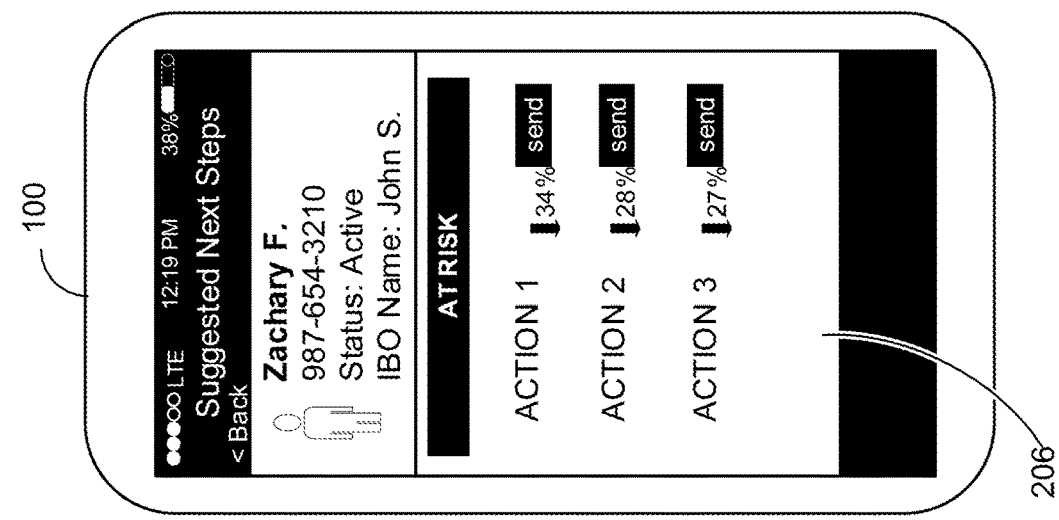
FIGS. 2A-2C show an example retention user interface for a relationship management application, and illustrate an output of examples of an alert and a recommendation of an action to take in response to the alert.
Figure 2B:
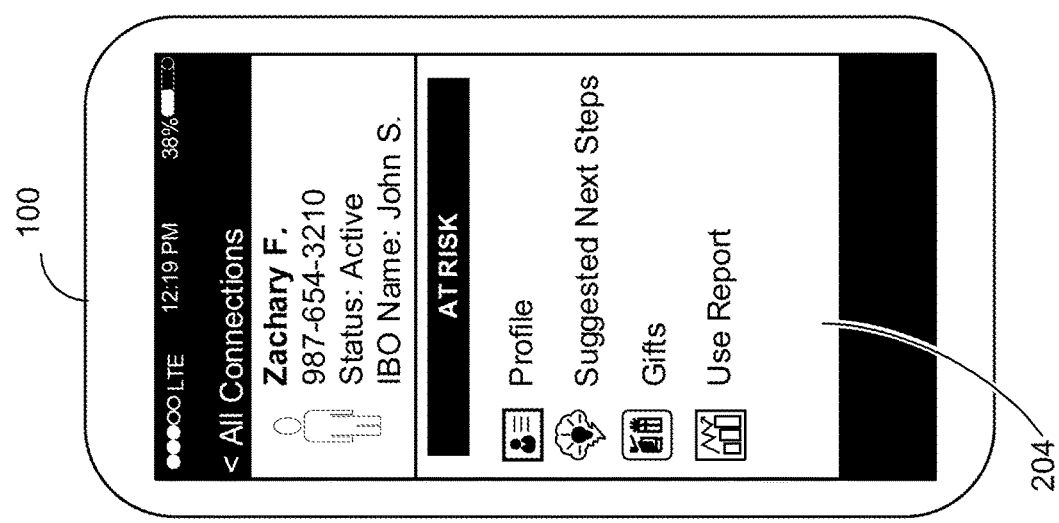
Figure 2A:
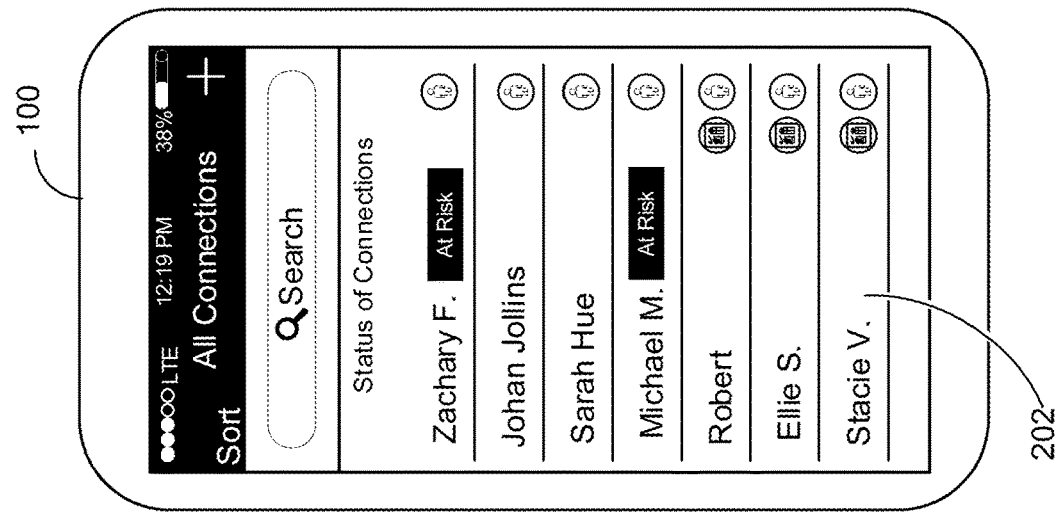

FIGS. 2A-2C show a mobile device 200 displaying example retention user interface for a user retention function of a relationship management application. First referring to FIG. 2A, user interface 202 displays an "at risk" designator next to a user's name. This indicates that a machine learning detector function has determined that the person meets a threshold likelihood of attrition. Next referring to FIG. 2B, upon selection of the user of interest's name on the user interface, the user interface transitions to one such as that shown at 204. Included in this interface is a "suggested next steps" control that is selectable to recommend next actions to take with regard to the user of interest to optimize a likelihood of the user of interest remaining an active member of the organization. As described in more detail below, such a functionality may not be included in some examples, or may be introduced at a later time than the detector while training data is gathered to train a machine learning-based optimizer underlying the detector functionality.

Interface 206 may be displayed after a user selects the "suggested next steps." Interface 206 illustrates three example actions that may be taken to decrease a likelihood that the user of interest will experience attrition. Interface 206 also shows, for each recommended action, a percentage decrease in the likelihood of user attrition if that action is taken as a next action, similarly to interface 108 of FIG. 1. As described below, the displayed decreased probabilities may correspond to hypothetical likelihoods determined by a machine learning model using the data for generating the default likelihood augmented with the illustrated action as a hypothetical next action. Further, interface 206 also includes "send" controls that allow the user of the mobile device 200 to easily take any of the recommended next actions by sending the corresponding material (or a link to the material) to the prospect.

Figure 3:
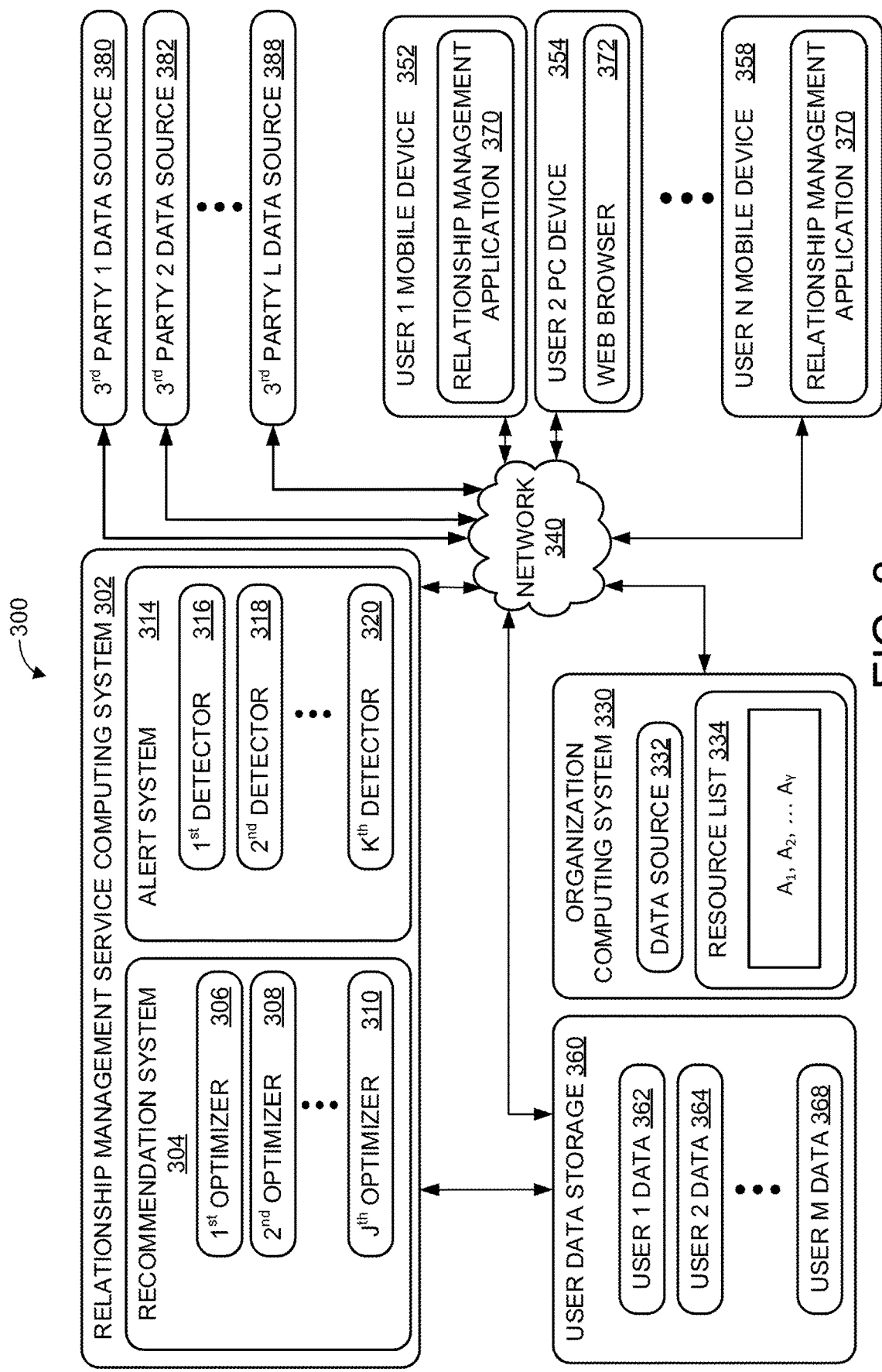
FIG. 3 shows an example use environment for a recommendations system and/or an alert system according to the present disclosure.

Before discussing the generation of recommendations and alerts in more detail, an example use environment 300 is described with reference to FIG. 3. Use environment 300 comprises a relationship management service computing system 302, an organization computing system 330, and user data storage 360, all of which are communicatively coupled to a plurality of user devices and a plurality of 3$^{rd}$ party data sources via network 340. The plurality of user devices includes mobile computing devices, such as user 1 mobile device 352, and user N mobile device 358, as well as personal computing (PC) devices, such as user 2 PC device 354, and any other suitable devices. Each user device of the plurality of the user devices may allow an associated user to interact with relationship management service computing system 302 and other users via an instance of a relationship management application 370, as is depicted for user mobile devices 352 and 358. Alternately, the device may instead allow an associated user to interact with relationship management service computing system 302 via a web page or web application viewed in a web browser 372, as with user 2 PC device 354. The plurality of 3$^{rd}$ party data sources may include 3$^{rd}$ party servers and/or cloud services, such as 3$^{rd}$ party 1 data source 380, 3$^{rd}$ party 2 data source 382, and 3$^{rd}$ party L data source 388. For example, 3$^{rd}$ party data sources may include analytic services, social network services, multimedia streaming services, and any other suitable sources of data.

Organization computing system 330 may be associated with any organization that may wish to utilize a relationship management service (whether operated by a 3$^{rd}$ party or the organization itself) to allow communications between organization members/associates within the organization and/or with outside prospects. Such a relationship management service may include functions related to prospects (as described with reference to FIGS. 1A-1C) and/or retention (as described with reference to FIGS. 2A-2C), and may be implemented via a server, cloud service, or any other suitable computing system. Organization computing system 330 may comprise, or otherwise provide access to, a data source 332, comprising data regarding one or more users. Data source 332 may contain any suitable data regarding a user, e.g., data regarding the user's membership in organization computing system 330, data regarding a history of interactions with other users of relationship management service computing system 302. Organization computing system 330 may further comprise, or otherwise provide access to, various resources that may be utilized by members, as represented by a resource list 334. Examples of such resources include, but are not limited to, sending an invitation to an event, sending a digital or physical incentive (e.g., a gift), and sending a coupon or promotional offer. Users may consume such resources to learn about the organization, to receive gifts and/or incentives, and enjoy other such benefits. In the example, resource list 334 stores Y different resources. The resources may be represented by a unique identifier, as with resources $A_1, A_2, \ldots A_Y$ of resource list 334. For example, an action definition that includes "watching a tutorial video" may be given the identifier $A_1$ while an action definition that includes "inviting three new users to join" may be given the identifier $A_2$. In other examples, a resource list may store any suitable number of resources, which may be labelled or accessed according to any suitable identifier. As the resources available to members of an organization evolve, organization computing system 330 may change the contents of resource list 334 accordingly, for example, by deleting, adding, or modifying resources stored in resource list 334.

In some examples, resources may be predefined by organization computing system 330. In other examples, resources may be personalized based on user data stored within user data storage 360 and/or user interactions occurring via relationship management application 370 and web browser 372. In some examples, code executable at relationship management service computing system 302, organization computing system 330, user devices (e.g., user 2 device 352), and/or 3$^{rd}$ party data sources (e.g., 3rd party 1 data source 380) may be configured to utilize the resources and to programmatically track the receipt and utilization of resources by a user. In other examples the receipt and utilization of the resource may not be tracked, or may be self-reported by a user. For example, a resource $A_3$ may comprise instructions to call a customer on the phone, where the phone call cannot be tracked by any specific device of relationship management service computing system 300. In this case, a user may later self-report having made a phone call according to the instructions, for example, by using a user interface feature of relationship management application 370 to submit a self-report to be stored in user data storage 360.

Relationship management service computing system 302, relationship management application 370 and/or web browser 372 are configured to coordinate the exchange of message between user devices, e.g., between user 1 mobile device 352, user 2 PC device 354, and user N mobile device 358. For example, user 1 mobile device 352 may send a message to user 2 mobile device 354 via network 340 to relationship management service computing system 302. Upon receipt of the message at relationship management service computing system 302, relationship management service computing system 302 may coordinate transmitting the content of the message back to user 2 mobile device 354 via network 340. Further, users may use relationship management applications 370 and/or web clients 372 to send recommendations to other users and/or prospects to consume resources provided to users of relationship management application 370 by organization computing system 330, such as the resources of resource list 334. As users consume the resources, the interactions with the resources may be detected and stored as actions by relationship management service computing system 302. For example, organization computing system 330 may provide a pre-defined message containing an invitation to watch a tutorial video as resource $A_5$, where the associated action to be performed is watching the video in a media player provided by relationship management application 370. Upon receipt of the message at relationship management service computing system 302, relationship management application 302 may store at user data storage 360 an indication of the message, including information such as a timestamp, identification of the sender and recipient of the message, content of the message, and/or an indication of any associated resources provided by computing system 330. Messages associated with resources may be sent by users to each other, or may be sent directly by organization computing system 330 to one or more users.

User data storage 360 is configured to store user data regarding actions taken by each user. For example, organization computing system 330 may send a message to user 1 asking them to perform action $A_1$ defined as "watching a tutorial video." If user 1 does watch the tutorial video in a media player of relationship management application 370, then relationship management application 370 may send a notification of this action to user data storage 360 and relationship management service computing system 302 via network 340. User data storage 360 may store a vector representation of user actions performed so far, suitable for using or training the optimizers of recommendation system 304 and the detectors of alert system 314, as described below with reference to FIGS. 5 and 6. In this manner, user data storage 360 may store data for each user of the system. User data storage 360 may acquire data from data source 332 of organization computing system 330, and from $3^{rd}$ party data sources, such as $3^{rd}$ party 1 data source 380, $3^{rd}$ party 2 data source 382, and $3^{rd}$ party L data source 388. The user data for a particular user may comprise data drawn from more than one $3^{rd}$ party source. For example, user 2 data 364 may be drawn from a combination of data source 332, $3^{rd}$ party 1 data source 380 and $3^{rd}$ party data source 382. User data storage 360 may store user 1 data 362, user 2 data 364, and additional data including user M data 368, for any M user subset of the N users.

Relationship management service computing system 302 further is configured to provide recommendations and alerts relating to user actions, as described above with regard to FIGS. 1A-2C. For example, based on user data in user data 360, relationship management service computing system 302 may be configured to provide, to a first user, recommendations or alerts concerning a second user. As a more specific example, if user 2 introduced user 1 to an organization associated with relationship management service computing system 302, then recommender system 304 of relationship management service computing system 302 may provide recommendations to user 2, to suggest actions to recommend to user 1 to increase the likelihood of retention of user 1 in the organization. Similarly, alert system 314 may provide user 2 with an alert, if user 1 is above a threshold likelihood of attrition from the organization.

Recommendations may be provided to an individual user responsive to a query made at a user device, or may be generated and provided to users on an aggregate basis. In some examples, relationship management service computing system 302 may receive a query from a first user device (e.g., user 2 mobile device 354) via network 340, requesting recommendations regarding a second user. For example, user 2 may request the best three recommendations to increase a likelihood of user 1 becoming a customer or distributor. Serving this request at relationship management service computing system 302 may include obtaining user data from user data storage 360, including user 1 data 362 which represents past actions taken by user 1.

Figure 4A:
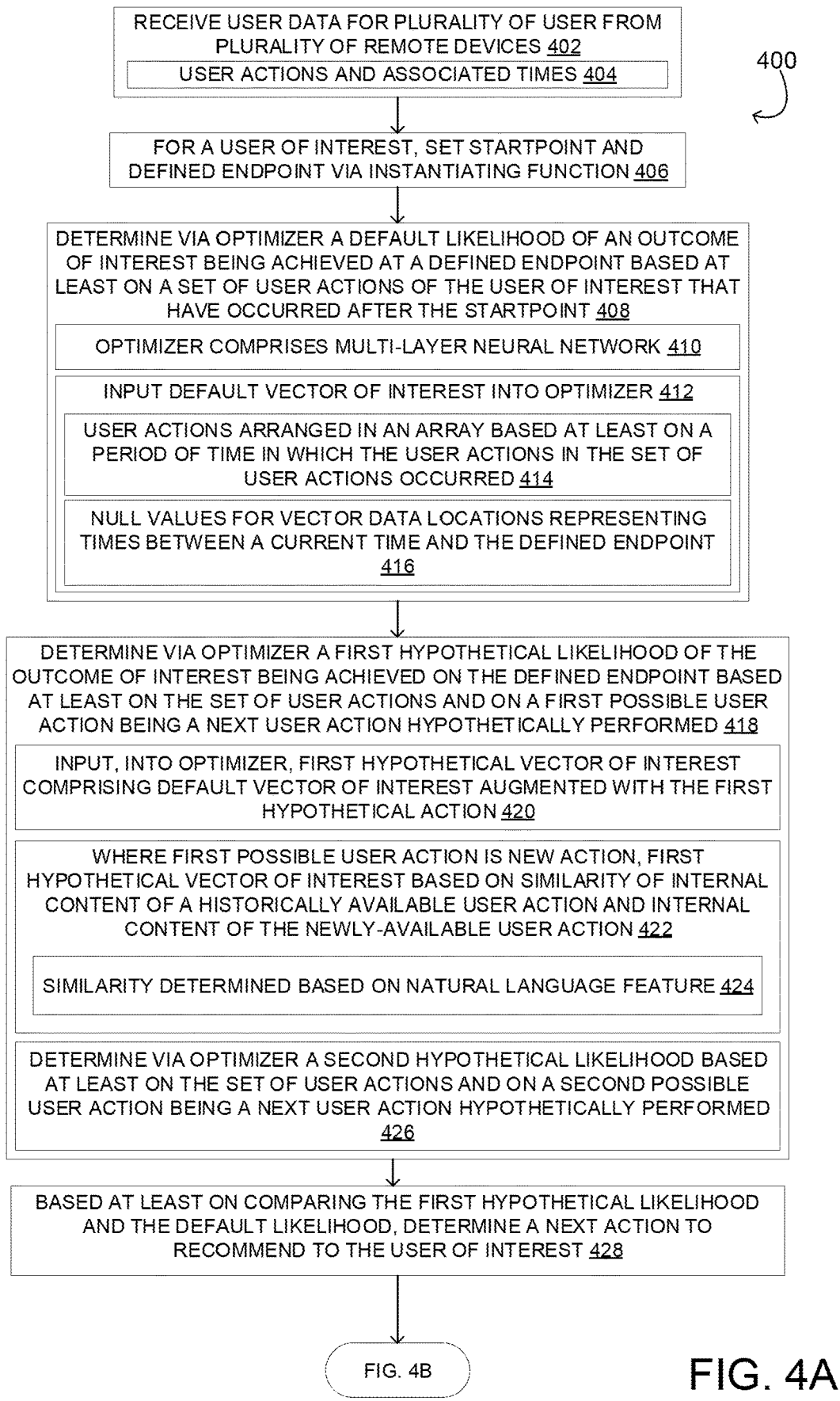
FIGS. 4A-4B show a flow diagram illustrating an example method for providing recommendations.
Figure 5:
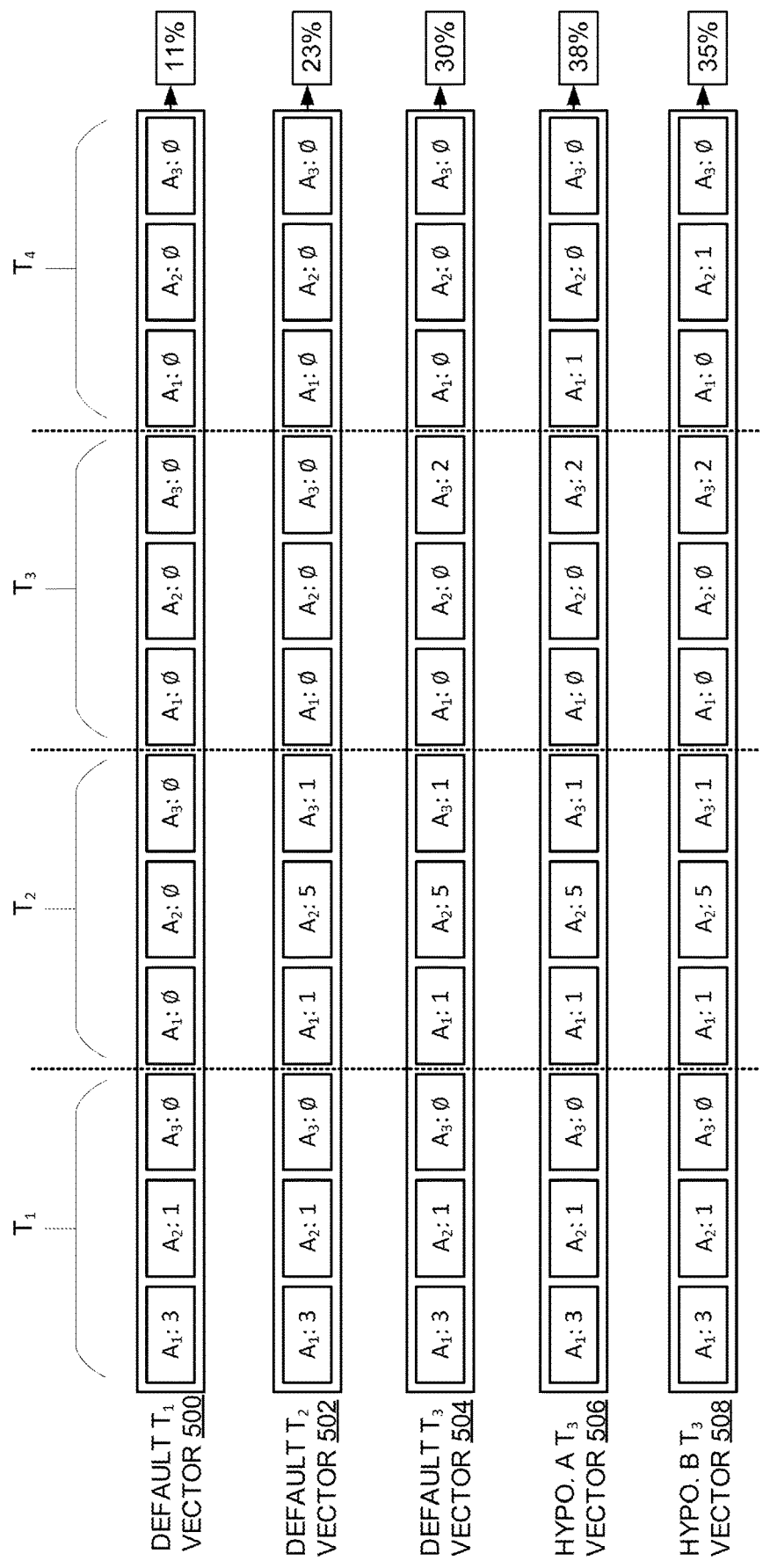
FIG. 5 shows a schematic depiction of example default vectors of interest and hypothetical vectors of interest.

Relationship management service computing system 302 may translate the user data regarding one or more users into a data structure suitable for use with an optimizer (e.g., optimizer 306), such as a vector of time-stamped user data as described with regard to FIG. 5. Relationship management service computing system 302 may use one or more optimizers of the plurality of optimizers to generate the best three recommendations (or other suitable number of recommendation), as described in more detail below with regard to FIG. 4A. In other examples, instead of generating recommendations responsive to a query arising from a user mobile device, relationship management service 302 may generate recommendations for many users in aggregate at recommender system 304. Such aggregate generation of recommendations may be done periodically or aperiodically, responsive a change in a feature of the user data stored in user data storage 360, or responsive to a query issued by organization computing system 330. When recommendations are generated in aggregate, new recommendations may be issued to a user device, even where the user device did not issue a query requesting new recommendations. For example, after determining aggregate recommendations for users 1 through N, relationship management service computing system 302 may suggest that user 2 recommend that user 1 perform action $A_3$, and send directions to do so to user 2 mobile device 354 via network 340.

Likewise, alerts may be provided to an individual user responsive to a query made at a user device, or may be generated and provided to users on an aggregate basis. As an example, relationship management service computing system may receive a query from a first user device (e.g., user 2 mobile device 354) via network 340, requesting alerts regarding a second user. For example, user 2 may request to see an alert regarding whether any user with whom they have a relationship (e.g. a connection on the relationship management application) is at risk of attrition. To serve such a request, relationship management service computing system 302 may obtain user data from user storage 360, and may translate the data into a data structure suitable for use with a detector (e.g., detector 316). Relationship management service computing system 302 then may use one or more detectors of the plurality of detectors to generate any appropriate alerts, as described in more detail below with regard to FIG. 7. After generating alerts using alert system 306, relationship management service computing system 302 may additionally generate recommendations using recommender system 304. For example, after sending an alert that user 1 is at a risk of attrition to user 2, an additional recommendation may be sent to user 2 to suggest an action to user 1 that may mitigate the risk.

In other examples, relationship management service computing system 302 may generate alerts for many users in aggregate. Such aggregate generation of alerts may be done periodically or aperiodically, responsive a change in a feature of the user data stored in user data storage 360, or responsive to a query issued by organization computing system 330. When alerts are generated in aggregate, new alerts may be issued to a user device, even if the user device did not issue a query requesting new alerts. For example, after determining whether any alerts need to be issued regarding users 1 through N, relationship management service computing system 302 may alert user 2 that user 1 is at risk of attrition.

Recommender system 304 may comprise a plurality of optimizers, illustrated as a first optimizer 306, a second optimizer 308, and a $J^{th}$ optimizer 310. Each optimizer comprises a machine learning model, such as a multi-layer neural network or any other suitable function. Similarly, alert system 314 comprises a plurality of detectors, which may include a first detector 306, a second detector 308, through a $K^{th}$ detector 320. Each detector similarly comprises a suitable machine learning model. Recommender system 304 and alert system 314 may be trained based on the user data in user data storage 360 as described below in more detail.

Relationship management service computing system 302 and user data storage 360 further may be configured to share analytic data, such as user data (e.g., user 1 data 362), data regarding the optimizers (e.g., optimizer 306) and detectors (e.g., detector 316) and/or any other suitable results of summary or analysis of the user data, to organization computing system 330. Organization computing system 330 may use such analytic data to adjust content to be included in the relationship management service, prospect user interface and/or retention interface, which may include new actions. For example, based on user data storage 360, organization computing system 330 may determine that 75% of users have already "watched the tutorial video," and in response to such determination, may provide a new action definition, e.g., "watch a second introductory video." Additionally, organization computing system 330 may use the analytic data for any other suitable purpose.

Figure 4B:
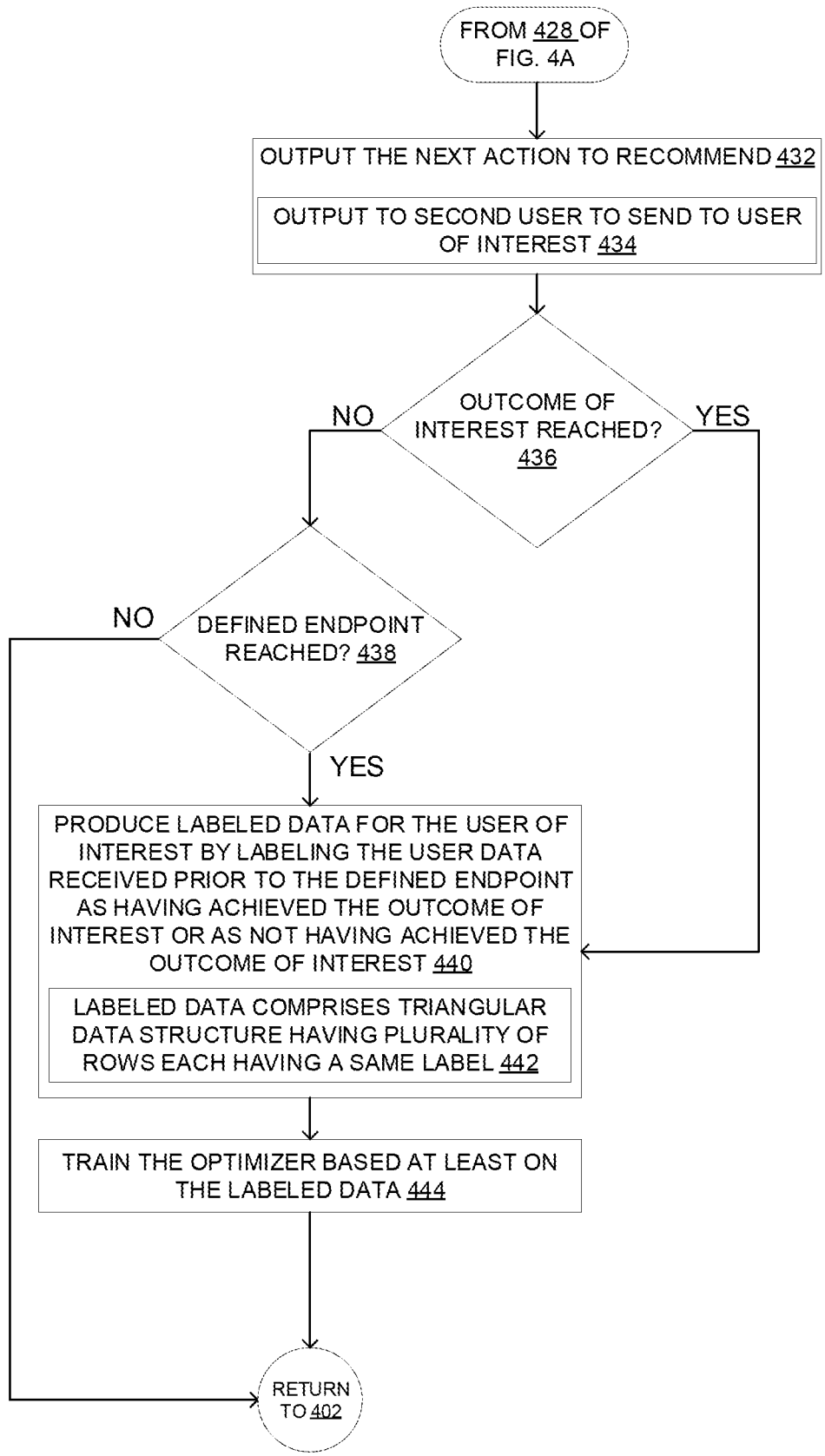

FIGS. 4A-B shows a flow diagram illustrating an example method 400 for providing recommendations using an optimizer as described above. Method 400 may be performed by any suitable computing system, including but not limited to the relationship management application environment described above with regard to FIG. 3. Method 400 comprises, at 402, receiving user data for a plurality of users from remote devices. The user data may be received, for example, from relationship management applications running on the devices or web clients, and may represents actions taken using such programs. Example actions include, but are not limited to, opening a file, watching a video, viewing a presentation, reading an article, and accepting an invitation. The user data with regard to an action may comprise any suitable data, such as an identification of the action, an identification of another user with regard to whom the action was taken, and an associated point in time at which the action was taken. In this manner, user data is gathered both for training a machine learning-based optimizer and also for using the optimizer to determine next actions to take to optimize the likelihood of an outcome of interest.

Continuing, method 400 further comprises, at 406 setting a start point and an endpoint for a user of interest via execution of an instantiating function. The user of interest may represent any suitable user, such as a new prospect. The instantiating function may be executed based upon the occurrence of any suitable event. In the example of the relationship management application described above, the instantiating function may execute upon the initial opening registration of a new account on the relationship management app by a new prospect, the downloading of the relationship management app on a new prospect's device, or any other suitable event. The start point and end point thus defined represent a start point and an end point of a vector of interest to use as input data for an optimizer. In other words, the vector of interest comprises data pertaining to time points occurring between the start point and the end point.

Method 400 further comprises, at 408, determining via the optimizer a default likelihood of an outcome of interest being achieved at the defined endpoint based at least on a set of user actions of the user of interest that have occurred after the start point. The optimizer may take any suitable form. As one example, the optimizer may comprise a multi-layer neural network, as indicated at 410, which may be a feed-forward neural network. Such a neural network may have any suitable number of hidden layers. In some examples, the number of layers in the neural network may be determined based at least on a function of the number of possible recommendations for a given point in a time. In some examples, the number of nodes in each hidden layer is selected to exceed the number of possible recommendations for a given point in time. In other examples, the optimizer may comprise a convolutional neural network (CNN), a recurrent neural network (e.g., long short-term memory (LSTM)), or any other suitable machine learning model, such as logistic regression, support vector machine (SVM), reinforcement learning, and/or decision tree methods. In still further examples, the optimizer may comprise a plurality of machine learning models which may be configured as a generative-adversarial network (GAN) or via ensemble methods, such as bootstrap aggregating (bagging) or boosting.

To determine the default likelihood, method 400 comprises inputting a default vector of interest into the optimizer, as indicated at 412, wherein the term default vector of interest represents a vector of interest that includes a set of user data taken from the start point to a current time. A vector of interest for inputting into an optimizer may take any suitable form. FIG. 5 illustrates example default vectors of interest representing analyses performed during different time periods between the start point and the end point for a user of interest based on user data recorded for each of the different time periods, and hypothetical vectors of interest representing analyses performed based on the user data and further based on a hypothetical user action being the next action performed by the user of interest. The vectors of interest as depicted represent data from four time periods between the start point and end point (e.g., four days). The first period $T_1$ and subsequent time periods ($T_2$ and $T_3$) may be any suitable period of time (e.g., one day each), but it will be understood that any other suitable time frame, divided up into any suitable number of time periods, may be used.

Each default vector comprises a set of user actions, arranged based on the period of time in which the user actions occurred (e.g., sorted into bins for time period $T_1$, $T_2$, or $T_3$), as indicated at 414. Further, as indicated at 416, each default vector of interest comprises null values for vector data locations representing times between a current time and the defined endpoint. For example, default $T_1$ vector 500 comprises a count of the number of times each of three user actions ($A_1$, $A_2$, $A_3$) was performed during each of four time periods ($T_1$, $T_2$, $T_3$, $T_4$), comprising a total of twelve elements arranged in order according to the time period. Default $T_1$ vector 500 represents the data input into the machine learning model after the occurrence of events during a first period $T_1$ and prior to the occurrence of events after the first period $T_1$. As such, default $T_1$ vector 500 comprises non-null counts for two of the possible actions performed by the user of interest during $T_1$, and null counts for each possible action occurring after the first period $T_1$.

FIG. 5 also shows an example likelihood value for each default vector that may be generated by inputting each default vector of interest into the optimizer. The associated output from the optimizer may be a single likelihood value representing a likelihood that the outcome of interest will occur on the endpoint, as shown to the right of each vector in FIG. 5. The output value associated with default $T_1$ vector 500 is a likelihood of 11%, representing the likelihood that the outcome of interest will occur on the endpoint based on the events occurring during $T_1$. In some examples, the likelihood value output by the optimizer may represent a likelihood that the outcome of interest will occur before the defined endpoint. In other examples, the likelihood value output by the optimizer may represent a likelihood that the outcome of interest will eventually occur (by or on the endpoint, or at any future time after the endpoint). In some examples, this likelihood may be displayed to another user to inform the other user of a likelihood of the user of interest experiencing the outcome of interest.

Continuing with FIG. 5, default $T_2$ vector 502 represents the data input into the machine learning model after the occurrence of events during a second period $T_2$ and prior to the occurrence of any events after $T_2$. Default $T_2$ vector 502 further comprises non-null counts for all three possible actions occurring during $T_2$. Note that default $T_2$ vector 502 has the same counts as default $T_1$ vector 500 for all three possible actions occurring during period $T_1$, illustrating that default $T_2$ vector 502 may be built up by starting with default $T_1$ vector 500 and adding counts of actions performed by the user of interest during $T_1$. The output value of default $T_2$ vector 502 is a likelihood of 23%, representing the likelihood that the outcome of interest will occur on the endpoint based on the events occurring during $T_1$ and $T_2$. Similarly, default $T_3$ vector 504 represents the data input into the machine learning model after $T_3$ and prior to the occurrence of any events after $T_3$, with an output likelihood of 30% representing the likelihood that the outcome of interest will occur on the endpoint based on the events occurring during $T_1$, $T_2$, and $T_3$. The actions represented in each default vector represent arbitrary actions that may or may not have been taken pursuant to earlier recommendations.

Returning to FIG. 400, method 400 comprises, at 418, determining via the optimizer a first hypothetical likelihood of the outcome of interest being achieved on the endpoint based at least on the set of user actions and on a first possible user action being a next user action hypothetically performed. In some examples, this may be performed by inputting into the optimizer a first hypothetical vector of interest comprising the default vector of interest augmented with the first hypothetical action, as indicated at 420. Further, additional hypothetical likelihoods of the outcome of interest being achieved may be determined for additional possible user actions being a next user action. This is indicated in method 400 at 426 as determining, via the optimizer, a second hypothetical likelihood of the outcome of interest being achieved on the endpoint based at least on the set of user actions and on a second possible user action being a next user action hypothetically performed.

FIG. 5 shows example hypothetical vectors of interest at 508 and 510. Hypothesis A for $T_3$ vector 506 comprises default $T_3$ vector 504 augmented by incrementing one of the available actions, $A_1$, to represent an analysis performed based on the user data and further based on hypothetical user action $A_1$ being the next action performed by the user of interest. Hypothesis A for $T_3$ vector 506 is used to determine a likelihood of the outcome of interest being achieved on the endpoint if $A_1$ were the next action performed by the user of interest during the next time period, $T_4$. Similarly, hypothesis B for $T_3$ vector 508 comprises default $T_3$ vector 504 augmented by incrementing a different available action, $A_2$, to determine a likelihood of the outcome of interest being achieved on the endpoint if $A_2$ were the next action performed by the user of interest during the next time period, $T_4$. In this example, hypothesis A for $T_3$ vector 506 has an associated likelihood of 38%, whereas hypothesis B for $T_3$ vector 508 has an associated likelihood of 35%. Inputting the first hypothetical vector of interest into the optimizer results in the output of a first hypothetical likelihood of the outcome of interest being achieved on the endpoint. Similarly, inputting the second hypothetical vector of interest into the optimizer results in the output of a second hypothetical likelihood of the outcome of interest being achieved on the endpoint. If desired, additional hypothetical user actions may be tested in this manner to determine additional likelihood values.

In some instances, a possible next user action may be a new action with little to no past use data with which to train the optimizer. Where such a new user action is included in a hypothetical vector of interest, an internal content of the new user action may be compared to the internal content of historically available user actions to determine a similarity of the new user action to a historically available user action, as indicated at 422. Similarly, in some instances, a historically available user action may become outdated. For example, a historically available user action may not be offered if it is no longer relevant (e.g., an action related to a holiday that occurred 3 months ago). Past data related to such an outdated action may still be utilized, by comparing the internal content of an available action to the internal content of the outdated action, to identify similarities between the outdated action and the available action. The term internal content refers to content which would be presented to a user or any representation thereof, such as textual, audio, and visual content (e.g., encoded in a video file) as opposed to metadata (e.g., time and date info, serial codes representing a category of action or an identifier of a particular action). Such a similarity may be determined in any suitable manner. As one example, the similarity may be determined based upon a comparison of a natural language feature of the new user action compared to a natural language feature of the historically available user action, as indicated at 424. Comparison of natural language features may include sentiment analysis, and may be performed in any suitable manner. For example, sentiment analysis may include latent semantic analysis and/or latent Dirichlet allocation. The comparison may further include a Hidden Markov Model, which may be used to model grammatical and semantic features of a natural language input. The comparison may further include extracting a feature representation such as bag-of-words, N-grams, and/or word vector embeddings, and performing a comparison based on the feature representation. The comparison may further comprise using the natural language features or the feature representation as input for any suitable machine learning model, such as a neural network, and comparing based on an output of the machine learning model. In other examples, any other suitable comparison may be made to determine a similarity.

After determining the set of likelihood values based on the hypothetical user actions, method 400 comprises, at 428, determining a next action to recommend to the user of interest based at least on comparing the default likelihood and the first likelihood. Where a second and/or additional hypothetical likelihoods are determined (at 426), method 400 may comprise, at 428, determining the next action to recommend to the user based on the second and additional hypothetical likelihoods, in addition to the default likelihood and the first hypothetical likelihood. The next action to recommend may be determined by a value of the likelihood, and/or based on any other suitable factors. After determining the next action to recommend, the next action is output at 430, potentially with other possible actions to recommend that also may increase a likelihood of achieving an outcome of interest, and potentially with a quantification of the increase in likelihood for display to the user receiving the recommendation. In some examples, the output may be provided to another user than the user of interest for the other user to send to the user of interest, as indicated at 434. In other examples, the recommendation may be provided directly to the user of interest.

Figure 6:
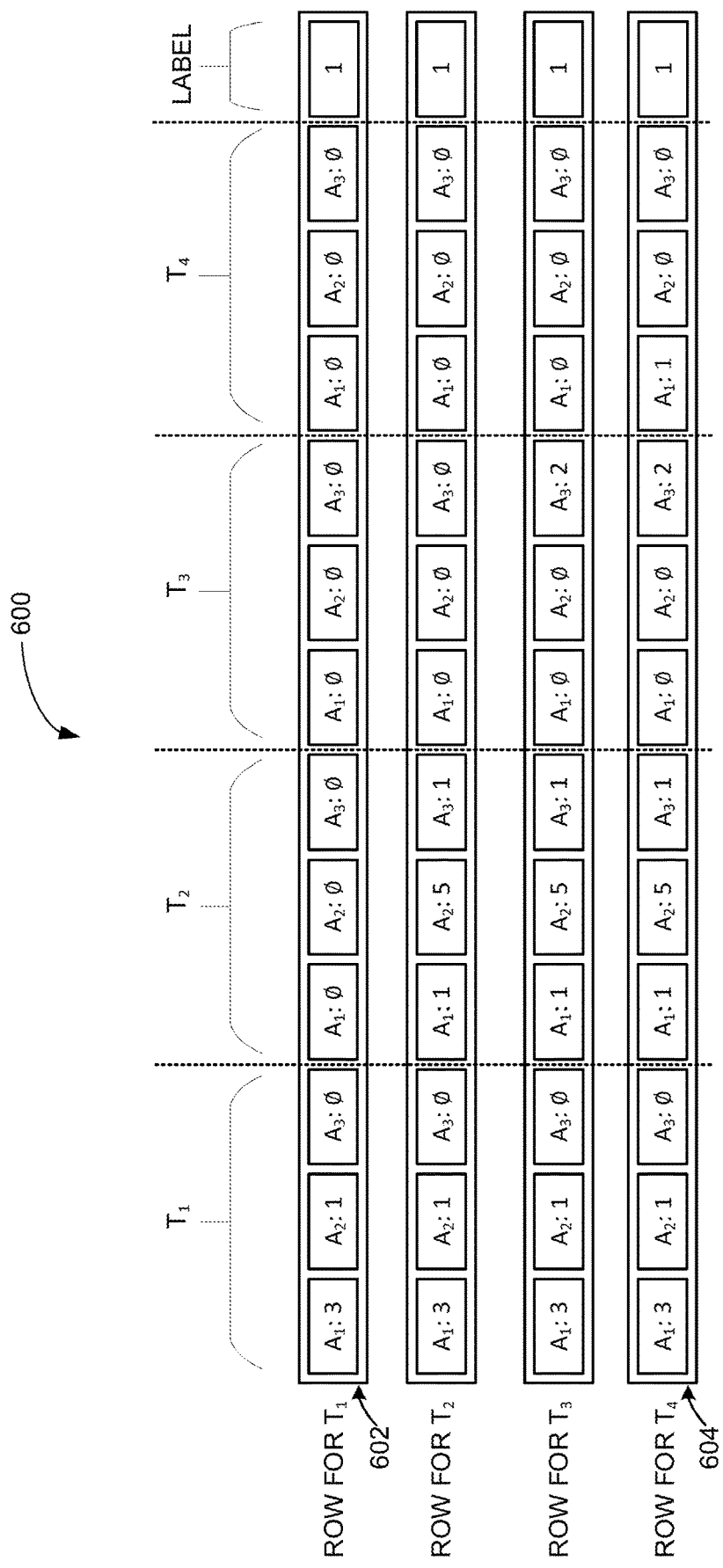
FIG. 6 shows a schematic depiction of example labeled training data.

The processes above may be repeated on a period basis, such as daily, every other day, weekly, etc. until the outcome of interest or the endpoint is reached, as indicated respectively at 436 and 438. Upon reaching the outcome of interest or the endpoint, method 400 comprises, at 440, producing labeled data for the user of interest by labeling the user data for the user of interest received prior to the endpoint as having achieved the outcome of interest or as having not achieved the outcome of interest, wherein the labeled data may be used to further train the optimizer. The labeled data may have any suitable content and format. FIG. 6 shows an example of labeled data 600 where the outcome of interest was achieved during the fourth time period, $T_4$, of a testing time frame comprising four time periods ($T_1$, $T_2$, $T_3$, $T_4$). As illustrated, labeled data 600 comprises a row containing each vector of interest input for the user of interest for each of the time periods ($T_1$, $T_2$, $T_3$, $T_4$), starting with a first vector of interest 602 for the first day of the testing period and terminating with a fourth vector of interest 604 for the sixth day of the testing period. In the example of labelled data 600, the first vector of interest 602 corresponds to default $T_1$ vector 500. The fourth vector of interest 604 corresponds to hypothesis A for $T_3$ vector 506. The second and third rows comprise vectors of interest corresponding to default $T_2$ vector 502 and default $T_3$ vector 504.

In view of this structure, and as indicated at 442 in FIG. 4, the labeled data comprises a triangular data structure having a plurality of rows, each row after the first row representing an additional day of user actions compared to a row immediately above, and each row labeled with the outcome actually achieved. In the example, the rows are labelled with the value 1 to indicate that the outcome of interest occurred. Labelled data 600 may correspond to the user of interest performing actions as depicted in default $T_1$, $T_2$, $T_3$ vectors 500, 502, and 504 respectively, receiving a recommendation to perform action $A_1$ as the next action at $T_4$, and performing action $A_1$ at $T_4$ according to the recommendation, where this sequence of actions results in the outcome of interest being achieved at $T_4$. Similarly, where the outcome of interest is not achieved by the endpoint, each row would be labeled as not having achieved the outcome of interest. After producing the labeled data, method 400 comprises, at 444, training the optimizer based at least on the labeled data. In this manner, the optimizer may be continually trained, thereby helping to further refine the optimizer as a set of possible user actions and a user base both change over time.

It will be understood that the optimizer of FIG. 4 may be trained to predict any other suitable outcome than a likelihood of a prospect becoming a customer or distributor. For example, a business may offer new customers an introductory free trial period. In such examples, an optimizer such that that of FIG. 4 may be configured to determine a likelihood of a new customer becoming paying customers at the end of the free trial period, and then determine actions to recommend the business to take to increase the likelihood of the customer becoming a paying customer.

As described above, the user data also may allow a machine learning model to be trained to identify a likelihood that an event, such as attrition of a customer or distributor, will occur based on long-term user data. Such a machine learning model may be trained using, for example, past user data that is labeled based upon whether or not the event occurred for each specific user in the training data set.

Figure 7:
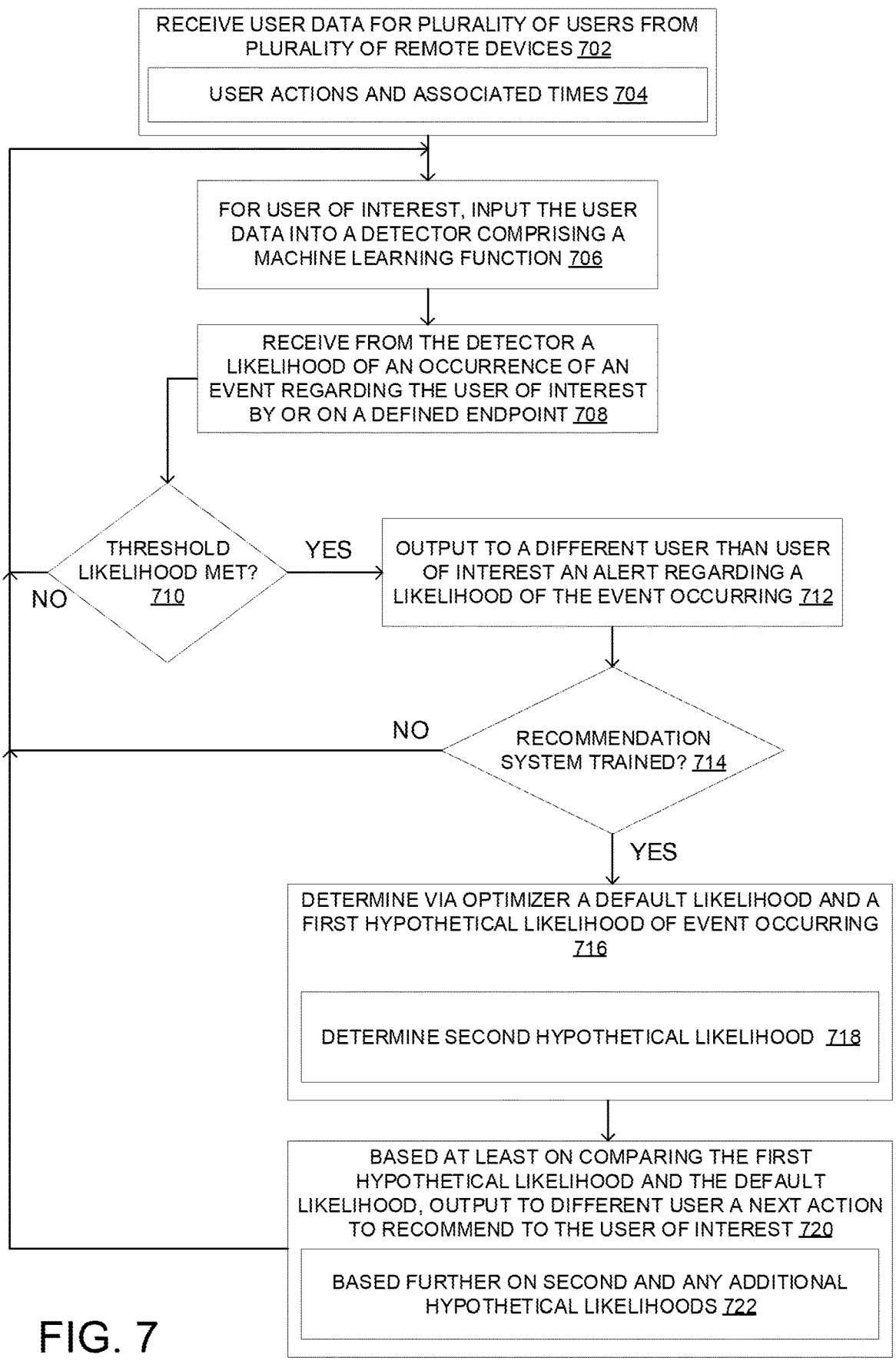
FIG. 7 shows a flow diagram illustrating an example method for detecting a likelihood of an occurrence of an event.

FIG. 7 shows a flow diagram illustrating an example of a method 700 for detecting a likelihood of an occurrence of an event. Method 700 comprises, at 702, receiving user data for plurality of users from plurality of remote devices, as described above with regard to method 400. The user data comprises information user actions and associated times, as indicated at 704. Method 700 further comprises, for a user of interest, inputting the user data into a detector comprising a trained machine learning model, and at 708, receive an output from the detector of a likelihood of an occurrence of an event regarding the user of interest by or on an endpoint. In contrast with method 400, which considered prospective relationships (e.g. customers, distributors) as users of interest, the user of interest of method 700 is a user having a previously established relationship, and the detector is configured to detect the likelihood of an event that may occur within such an established relationship. In addition to customer retention, other possible events for which a likelihood of occurrence may be detected include relapse of a person in counseling (e.g. drug counseling) and employee retention.

The input vector for the detector of method 700 may take any suitable form. For example, the input vector may comprise a linear array of user actions and associated times, as described above with regard to FIGS. 4 and 5. The input vector may include data from only a limited period of time, or may include data from the entire use history of the user of interest. Likewise, the input vector may possibly include all types of user actions that can be performed in the system, or only a subset of actions. Further, the detector may utilize any suitable type of machine learning model. One example comprises a multi-layer neural network. Other examples include those given above regarding FIG. 4.

Continuing, method 700 comprises, at 710, determining whether the likelihood output by the detector meets a threshold likelihood. If the threshold likelihood is not met, then method 700 returns, and is again performed for the user of interest at a later time (e.g. a next day, a next week, or at any other suitable interval or triggering event). On the other hand, if the threshold likelihood is met, then method 700 comprises, at 712, outputting an alert to a different user than the user of interest, wherein the alert regards the likelihood of the event occurring. In some instances, the alert may be output to a single other user, while in other examples, the alert may be output to multiple other users, such as all social contacts in a relationship management app as described above. Further, in some examples, the output may be a simple indication that the threshold is met, while in other examples the output may include a quantification of the likelihood.

In some examples, outputting the alert may be the sole action taken upon detecting a threshold likelihood of the event occurring for the user of interest. In other examples, a recommendation system may be available for providing a recommendation of a next action or action for the other user to take to optimize an outcome with regard to the event. Such a system may comprise an optimizer that is trained, for example, by observing actions taken by the other user or users to whom the alert was sent with regard to the user of interest, and observing the result of such actions. For example, if the detector is configured to predict a likelihood that a user of interest may drop off in ten days, then actions taken by recipients of the alert may be observed for that period of time, and the recommendation system may be trained based upon this outcome. Such an optimizer may take a similar form as that described above with regard to FIGS. 4-6. Where the recommendation system is implemented, there may be a training period where it is not yet used to produce recommendations. An example training process is described below.

Continuing, if a recommendation system is available (as indicated at 714), then method 700 comprises, at 716, determining via an optimizer of the recommendation system a default likelihood of the event occurring and a first hypothetical likelihood based on a first possible user action being a next user action. As described above with regard to claim 1, this may be performed by inputting a default vector of interest comprising a set of user actions that have occurred during a set period of time (e.g. within the last 5 days, 10 days, etc.), augmented with a first possible user action when determining the first hypothetical likelihood. A second hypothetical likelihood also may be determined, and possibly others, as indicated at 718. The hypothetical likelihoods may be compared to the default likelihood, and at 720, based at least on comparing the first hypothetical likelihood and the default likelihood (and potentially the second and other hypothetical likelihoods, as indicated 722), method 700 comprises outputting to one or more different users a next action to recommend to the user of interest. In this manner, a likelihood of the occurrence or non-occurrence of the event (depending upon what outcome the optimizer is configured to determine) may be optimized by the other user(s) taking the recommended action or actions.

Figure 8:
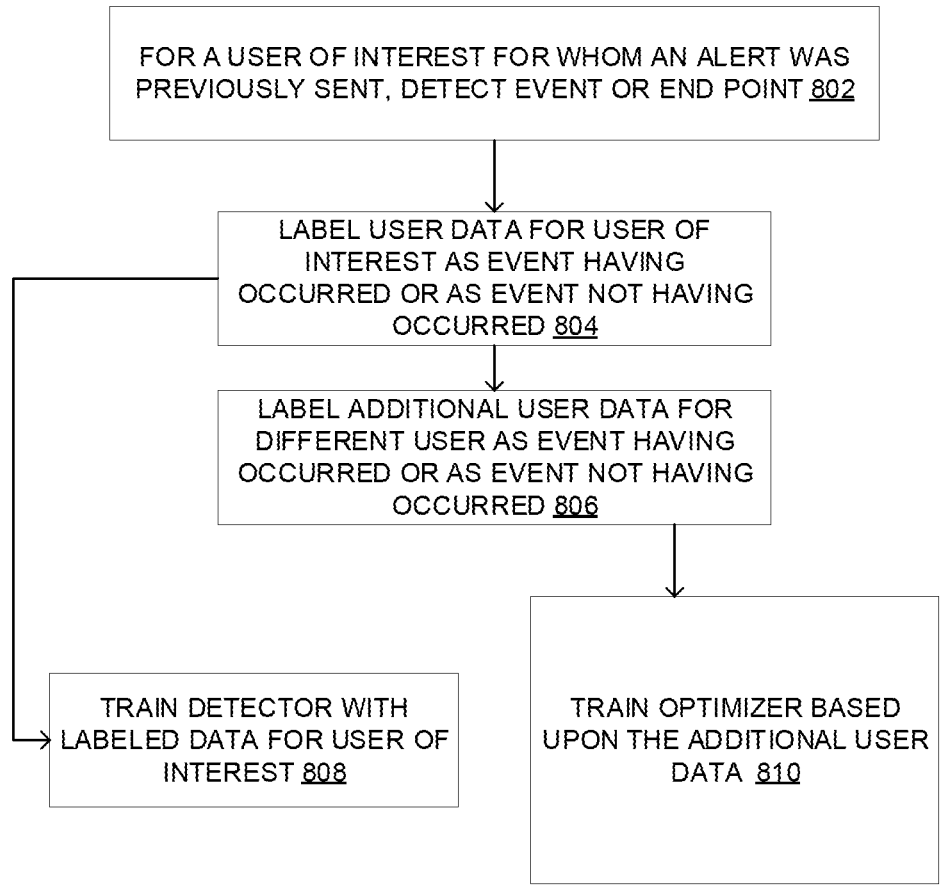
FIG. 8 shows a flow diagram depicting an example method for training a machine learning model.

FIG. 8 shows a flow diagram depicting an example method 800 for training an optimizer for use in providing recommendations, and also training a detector for use in providing alerts, as described above. Method 800 may be performed by any suitable computing system, including but not limited to the relationship management application environment described above with regard to FIG. 3.

Method 800 comprises, at 802, detecting an event or endpoint for a user of interest for whom an alert was previously sent to other users, as described above with regard to FIG. 7. Next, method 800 comprises, at 804, labelling the user data for the user of interest with regard to the event having occurred or the event not having occurred by the endpoint. As described above with regard to FIGS. 4 and 6, the labelled data may take the form of a "triangular array" of input vectors. Each row in the "triangle" may correspond to a limited period of time from the use history of the user of interest, where the limited periods of time may have a common start point. Each of the labelled data rows for the user of interest may be labelled with an identical label, indicating the event having occurred or the event not having occurred. Method 800 further comprises, at 806, labelling additional user data for the different user with regard to the event having occurred or the event not having occurred. The labelled data for the different user may take any suitable form, such as the previously-described "triangular array" of input vectors.

After labelling the user data for the user of interest, method 800 further comprises, at 808, training a detector based at least on the labeled data for the user of interest using any suitable training criteria. As an example of a training criterion, the detector may be trained based on a prediction accuracy of detecting the event of interest based on the labelled data. Alternately or additionally, the detector may be trained based on an additional measure of prediction quality, such as precision, recall, or based on integrating the area under a receiver operating characteristic curve. Alternately or additionally, the detector may be trained with regard to the internal structure or characteristics of a machine learning model, for example by using a regularization technique to train a "sparse" model in which a relatively small number of training parameters of the trained machine learning model are non-zero values, which may aid in model performance and interpretability. In some examples, the machine learning model may be trained using gradient descent, conjugate gradient methods, or any other suitable method of training or optimization, according to the machine learning model and a loss function based on the training criteria as described above (e.g., according to a loss function that measures accuracy and recall). In an example where the machine learning model is a multilayer neural-network, the multilayer neural-network may be trained by using backpropagation to obtain gradient data, and using the gradient data to perform batch gradient descent. In this manner, the detector may be continually trained, thereby helping to further refine the detector as a set of possible user actions and a user base both change over time.

Likewise, after labelling the user data for the different user, method 800 further comprises, at 814, training an optimizer based on the additional user data for the user of interest and for the different user, which includes actions the different user took after receiving the alert. The optimizer may be trained, for example, based on an accuracy of determining the likelihood of the event occurring, based on actions taken by the user of interest and based on actions recommended to the user of interest by the different user. Alternately or additionally, the optimizer may be trained based on any other suitable training criterion, as described above with regard to the detector. In this manner, the optimizer may be continually trained, thereby helping to further refine the optimizer as a set of possible user actions and a user base both change over time.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
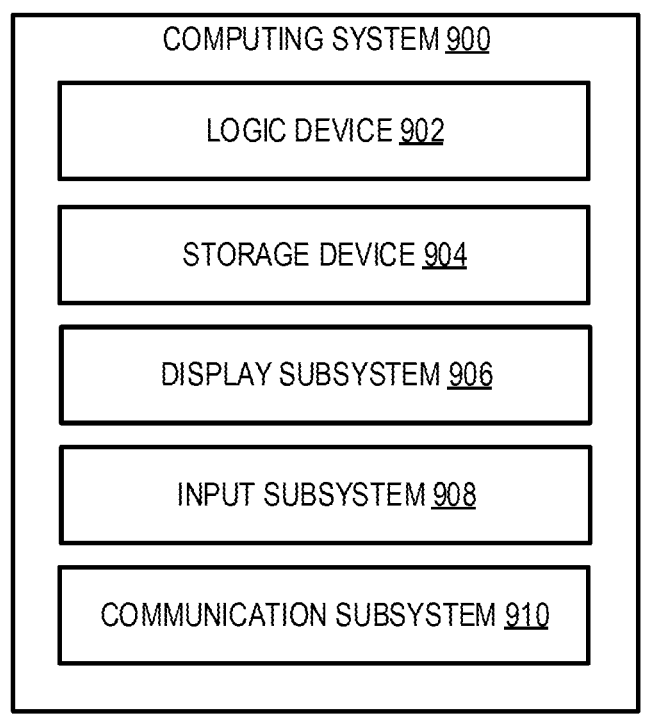
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic device 902 and a storage device 904. Computing system 900 may optionally include a display subsystem 906, input subsystem 908, communication subsystem 910, and/or other components not shown in FIG. 9.

Logic device 902 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 904 includes one or more physical devices configured to hold instructions executable by the logic device to implement the methods and processes described herein. When such methods and processes are implemented, the state of storage device 904 may be transformed—e.g., to hold different data.

Storage device 904 may include removable and/or built-in devices. Storage device 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 904 may include volatile, nonvolatile, dynamic, static, read/write, read-only, random-access, sequential-access, location-addressable, file-addressable, and/or content-addressable devices.

It will be appreciated that storage device 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 902 and storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic device 902 executing instructions held by storage device 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage device 904. This visual representation may take the form of a graphical user interface (GUI). As the herein described methods and processes change the data held by the storage device, and thus transform the state of the storage device, the state of display subsystem 906 may likewise be transformed to visually represent changes in the underlying data. Display subsystem 906 may include one or more display devices utilizing virtually any type of technology. Such display devices may be combined with logic device 902 and/or storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides a recommendation system comprising a logic device, and a storage device holding instructions executable by the logic device to receive, from a plurality of remote devices, user data corresponding to a plurality of users, where the user data for each user comprises a set of user actions that have been performed by the user, and for each user action, a point in time at which the user action was performed; and for a user of interest, determine, using an optimizer comprising a machine learning model, a default likelihood of an outcome of interest being achieved based at least on a set of user actions of the user of interest that have occurred after a start point and before an endpoint, the start point and the endpoint set by an instantiating function, determine, using the optimizer, a first hypothetical likelihood of the outcome of interest being achieved based at least on the set of user actions and on a first possible user action being a next user action hypothetically performed, based at least on comparing the first hypothetical likelihood and the default likelihood, determine a next action to recommend to the user of interest, and output the next action to recommend. In this example or any other example, the instructions are further executable to determine, using the optimizer, a second hypothetical likelihood of the outcome of interest being achieved based at least on the set of user actions and on a second possible user action being the next user action hypothetically performed, and to further base the output on the second hypothetical likelihood. In this example or any other example, the instructions are further executable to output the next action to recommend to a second user for the second user to send to the user of interest. In this example or any other example, the optimizer comprises a multi-layered neural network. In this example or any other example, the instructions are further executable to input a default vector of interest into the optimizer, the default vector of interest comprising the set of user actions arranged in an array based at least on an order of time in which the user actions in the set of user actions occurred and comprising null values for vector data locations representing times between a current time and the endpoint. In this example or any other example, the instructions are further executable to determine the first hypothetical likelihood by inputting a first hypothetical vector of interest into the optimizer, the first hypothetical vector of interest comprising the default vector of interest augmented with the first hypothetical action. In this example or any other example, the instructions are further executable to produce labeled data for the user of interest by labeling the user data as having achieved the outcome of interest or as not having achieved the outcome of interest; and train the optimizer based at least on the labeled data. In this example or any other example, the labeled data for the user of interest comprises a triangular data structure having a plurality of rows each having a same label. In this example or any other example, the first possible user action is a newly-available user action, and determining the first hypothetical likelihood is further based at least on a similarity of internal content of a historically available user action and internal content of the newly-available user action. In this example or any other example, comparing the historically available action and the first possible action is based at least on a natural language feature. In this example or any other example, the outcome of interest comprises the user of interest entering an obligation at the endpoint.

Another example provides a method of operating a recommendations system on a computing system comprising a logic device and a storage device. The method comprises receiving, from one or more remote devices, user data corresponding to a plurality of users, where the user data for each user comprises a set of user actions that have been performed by the user, and for each user action, a point in time at which the user action was performed for a user of interest, prior to reaching an endpoint, determining, using an optimizer comprising a machine learning model, a default likelihood of an outcome of interest being achieved based at least on a set of user actions of the user of interest that have occurred after an instantiating function performed by the user of interest, the instantiating function triggering setting of the endpoint, determining, using the optimizer, a first hypothetical likelihood of the outcome of interest being achieved based at least on the set of user actions and on a first possible user action being a next user action hypothetically performed, based at least on comparing the first hypothetical likelihood and the default likelihood, determining a next action to recommend to the user of interest, and outputting the next action to recommend to the user of interest; for the user of interest, producing labeled data by labeling the user data received prior to the endpoint as having achieved the outcome of interest or as not having achieved the outcome of interest; and training the optimizer based at least on the labeled data. In this example or any other example, determining the default likelihood comprises inputting a default vector of interest into the optimizer, the default vector of interest comprising the set of user actions arranged in an array based at least on an order of time in which the user actions in the set of user actions occurred and comprising null values for vector data locations representing times between a current time and the endpoint. In this example or any other example, determining the first hypothetical likelihood comprises inputting a first hypothetical vector of interest into the optimizer, the first hypothetical vector of interest comprising the default vector of interest augmented with the first hypothetical action. In this example or any other example, the labeled data for the user of interest comprises a triangular data structure having a plurality of rows each having a same label.

Another example provides an alert system comprising a logic device, and a storage device holding instructions executable by the logic device to receive, from a plurality of remote devices, user data corresponding to a plurality of users, where the user data for each user comprises a set of user actions that have been performed by the user, and for each user action, a point in time at which the user action was performed; and for a user of interest, input the user data into a detector comprising a machine learning model, receive from the detector a likelihood of an occurrence of an event regarding the user of interest, and when the likelihood exceeds a threshold likelihood, then output an alert regarding a likelihood of the event occurring to a different user than the user of interest. In this example or any other example, the instructions are executable to receive additional user data regarding actions taken by the different user with regard to the user of interest after the alert, and based upon the additional user data, train an optimizer comprising a machine learning model, the optimizer being configured to recommend actions to take to change the likelihood of the event occurring. In this example or any other example, the likelihood is a default likelihood, and the instructions are further executable to determine, using the optimizer, a hypothetical likelihood of the event occurring based at least on the user data for the user of interest and on a first possible user action being a next user action hypothetically performed, and based at least on comparing the first hypothetical likelihood and the default likelihood, output to the different user a next action to recommend to the user of interest. In this example or any other example, the instructions are further executable to, for the user of interest, if the event occurs, produce labeled data by labeling the user data received for the user of interest prior to the event as having experienced the event; and train the detector based at least on the labeled data. In this example or any other example, the instructions are further executable to set a defined endpoint, and the likelihood received from the detector is a likelihood of an occurrence of an event regarding the user of interest by or on the defined endpoint.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A recommendation system, comprising:
    a logic device; and
    a storage device holding instructions executable by the logic device to
        receive, from a plurality of remote devices, user data corresponding to a plurality of users, where the user data for each user comprises a set of user actions that have been performed by the user, and for each user action, a point in time at which the user action was performed; and
        for a user of interest,
            determine, using an optimizer comprising a machine learning model trained based upon the user data corresponding to the plurality of users, a default likelihood of an outcome of interest being achieved based at least on a set of user actions of the user of interest that have occurred after a start point and before an endpoint, the start point and the endpoint set by an instantiating function,
            determine, using the optimizer, a first hypothetical likelihood of the outcome of interest being achieved based at least on the set of user actions and on a first possible user action being a next user action hypothetically performed,
            based at least on comparing the first hypothetical likelihood and the default likelihood, determine a next action to recommend to the user of interest, wherein the next action is associated with a relatively higher likelihood of the outcome of interest being achieved, and
            output the next action to recommend.

2. The recommendation system of claim 1, wherein the instructions are further executable to determine, using the optimizer, a second hypothetical likelihood of the outcome of interest being achieved based at least on the set of user actions and on a second possible user action being the next user action hypothetically performed, and to further base the output on the second hypothetical likelihood.

3. The recommendation system of claim 1, wherein the instructions are further executable to output the next action to recommend to a second user for the second user to send to the user of interest.

4. The recommendation system of claim 1, wherein the optimizer comprises a multi-layered neural network.

5. The recommendation system of claim 1, wherein the instructions are further executable to input a default vector of interest into the optimizer, the default vector of interest comprising the set of user actions arranged in an array based at least on an order of time in which the user actions in the set of user actions occurred and comprising null values for vector data locations representing times between a current time and the endpoint.

6. The recommendation system of claim 5, wherein the instructions are further executable to determine the first hypothetical likelihood by inputting a first hypothetical vector of interest into the optimizer, the first hypothetical vector of interest comprising the default vector of interest augmented with the first hypothetical action.

7. The recommendation system of claim 1, wherein the instructions are further executable to,
    produce labeled data for the user of interest by labeling the user data as having achieved the outcome of interest or as not having achieved the outcome of interest; and
    train the optimizer based at least on the labeled data.

8. The recommendation system of claim 7, wherein the labeled data for the user of interest comprises a triangular data structure having a plurality of rows each having a same label.

9. The recommendation system of claim 1, wherein the first possible user action is a newly-available user action, and wherein determining the first hypothetical likelihood is further based at least on a similarity of internal content of a historically available user action and internal content of the newly-available user action.

10. The recommendation system of claim 9, wherein comparing the historically available action and the first possible action is based at least on a natural language feature.

11. The recommendation system of claim 1, wherein the outcome of interest comprises the user of interest entering an obligation at the endpoint.

12. On a computing system comprising a logic device and a storage device, a method of operating a recommendations system, the method comprising:
    receiving, from one or more remote devices, user data corresponding to a plurality of users, where the user data for each user comprises a set of user actions that have been performed by the user, and for each user action, a point in time at which the user action was performed;
    for a user of interest, prior to reaching an endpoint,
        determining, using an optimizer comprising a machine learning model trained based upon the user data corresponding to the plurality of users, a default likelihood of an outcome of interest being achieved based at least on a set of user actions of the user of interest that have occurred after an instantiating function performed by the user of interest, the instantiating function triggering setting of the endpoint,
        determining, using the optimizer, a first hypothetical likelihood of the outcome of interest being achieved based at least on the set of user actions and on a first possible user action being a next user action hypothetically performed,
        based at least on comparing the first hypothetical likelihood and the default likelihood, determining a next action to recommend to the user of interest, wherein the next action is associated with a relatively higher likelihood of the outcome of interest being achieved, and
        outputting the next action to recommend to the user of interest;
    for the user of interest, producing labeled data by labeling the user data received prior to the endpoint as having achieved the outcome of interest or as not having achieved the outcome of interest; and training the optimizer based at least on the labeled data.

13. The method of claim 12, wherein determining the default likelihood comprises inputting a default vector of interest into the optimizer, the default vector of interest comprising the set of user actions arranged in an array based at least on an order of time in which the user actions in the set of user actions occurred and comprising null values for vector data locations representing times between a current time and the endpoint.

14. The method of claim 13, wherein determining the first hypothetical likelihood comprises inputting a first hypothetical vector of interest into the optimizer, the first hypothetical vector of interest comprising the default vector of interest augmented with the first hypothetical action.

15. The method of claim 12, wherein the labeled data for the user of interest comprises a triangular data structure having a plurality of rows each having a same label.

16. An alert system, comprising:
a logic device; and
a storage device holding instructions executable by the logic device to
receive, from a plurality of remote devices, user data corresponding to a plurality of users, where the user data for each user comprises a set of user actions that have been performed by the user, and for each user action, a point in time at which the user action was performed; and
for a user of interest,
input the user data into a detector comprising a machine learning model trained based upon the user data corresponding to the plurality of users;
receive from the detector a likelihood of an occurrence of an event regarding the user of interest; and
when the likelihood exceeds a threshold likelihood, then output an alert to a different user than the user of interest, the alert regarding a likelihood of the event occurring to the user of interest.

17. The alert system of claim 16, wherein the instructions are executable to
receive additional user data regarding actions taken by the different user with regard to the user of interest after the alert, and
based upon the additional user data, train an optimizer comprising a machine learning model, the optimizer being configured to recommend actions to take to change the likelihood of the event occurring.

18. The alert system of claim 17, wherein the likelihood is a default likelihood, and wherein the instructions are further executable to
determine, using the optimizer, a hypothetical likelihood of the event occurring based at least on the user data for the user of interest and on a first possible user action being a next user action hypothetically performed, and
based at least on comparing the first hypothetical likelihood and the default likelihood, output to the different user a next action to recommend to the user of interest.

19. The alert system of claim 17, wherein the instructions are further executable to,
for the user of interest, if the event occurs, produce labeled data by labeling the user data received for the user of interest prior to the event as having experienced the event; and
train the detector based at least on the labeled data.

20. The alert system of claim 18, wherein the instructions are further executable to set a defined endpoint, and wherein the likelihood received from the detector is a likelihood of an occurrence of an event regarding the user of interest by or on the defined endpoint.

* * * * *